3,184,381
URINARY CALCULI TREATING COMPOSITIONS AND METHODS OF USING SAME

Harvey Ashmead, 719 E. Center, Kaysville, Utah, and Floyd R. Mencimer, 3424 Iowa Ave., Ogden, Utah
No Drawing. Filed Feb. 28, 1961, Ser. No. 92,147
8 Claims. (Cl. 167—53)

This invention pertains to the utilization of base exchange substances and other non-base exchange substances such as colloidal carriers in a synergistic and/or additive combination for the prevention and treatment of urinary calculi or professionally referred to as urolithiasis. This synergistic or additive effect results not only from increased activity of one or more ion exchange substances with a colloidal carrier but in addition presents an alkalization and buffering action on the urinary system thus increasing the chelation phenomenon.

In the past, EDTA has been used for treating urinary calculi, however, this has not been satisfactory in all cases. The chelating action of the EDTA was limited to cations such as calcium and magnesium. However, in many cases, urinary calculi prevention and control in male cattle and sheep is far more complex than merely solubilizing calcium and magnesium cations by chelation. Urinary calculi may have several predisposing causes and subsequent precipitate formulations. Examples are insoluble oxolate salts, calcium salts, phosphate salts, silicates and mucoproteins surrounded by metallic cations and/or mucoproteins surrounded by anions or mixtures of cations and anions.

It is the object of the present invention to provide a composition for the treatment of all types of urinary calculi in animals.

Another object is to provide a composition which can be used to prevent urinary calculi in animals.

Another object is to provide a composition that can be administered orally to animals.

A further object is to provide a composition useful in the prevention and treatment of urinary calculi which can be mixed with animal feeds.

Other objects and advantages will in part be obvious and in part appear hereinafter.

We have discovered that by using a combination of a chelate or chelates, a sequestering agent, a chelating resin and a colloidal carrier, we can produce a composition which is not only successful in treating all types of urinary calculi regardless of causes, but is also effective as a preventative of urinary calculi.

More specifically, our composition consists of a combination of EDTA, sodium tripolyphosphate, poly-n-vinyl-5-methyl-2-oxazolidone and carboxymethylcellulose in the following proportions:

*Formula No. 1*

| | Grams |
|---|---|
| EDTA | 1 |
| Sodium tripolyphosphate | 1 |
| Carboxymethylcellulose | 1 |

*Formula No. 2*

| | Grams |
|---|---|
| EDTA | 1 |
| Sodium tripolyphosphate | 1 |
| Poly-n-vinyl-5-methyl-2-oxazolidone | 1 |

*Formula No. 3*

| | Grams |
|---|---|
| EDTA | ½ |
| Sodium tripolyphosphate | 1 |
| Poly-n-vinyl-5-methyl-2-oxazolidone | ½ |
| Carboxymethylcellulose | 1 |

*Formula No. 4*

| | Grams |
|---|---|
| EDTA | 2 |
| Sodium tripolyphosphate | 1.5 |
| Carboxymethylcellulose | .5 |

Chelates such as ethylendiamintetraacetic acid (EDTA) are helpful in the prevention and/or treatment of urinary calculi when taken by mouth by assisting the assimilation of poorly soluble cations by specifically complexing with the cation either through prevention of forming precipitates or by dissolving pre-existing precipitates. Examples of cations susceptible to chelation are lead, barium, cadmium, zinc, copper, nickel, cobalt, iron, manganese, calcium, aluminum and magnesium. Chelates also scavage the gastrointestinal tract and remove insoluble salts of poorly soluble cations which may act as a block to feed assimilation and/or drug absorption and activity. Therefore, through such action, these agents in combination with cellulose gums lend themselves as an aid in increasing feed efficiency and drug absorption. More specifically, this action results from the ability of cellulose gums to act as absorbers and demonstrate anion exchange behavior. EDTA's action is on cations. Cellulose gums, by making use of anion exchange and/or absorption properties and EDTA by its cation complexing properties allow the body to function more efficiently by controlling the level of free ions in the food milieu. These agents also demonstrate viral antigen absorption as well as aids in elimination of poorly soluble calcium phosphate, calcium sulfate, magnesium silicate, etc., which can act as carriers for virus aiding infection thus allowing greater drug activity by reducing the area of competition for the drug and its action. They also control assimilation of poorly soluble cations during stimulation of water intake by use of high sodium chloride diets. They control fermentation and other gas forming chemical reactions within the animal's body where such reactions are accelerated by the cations complexing. Other chelates which can be used are sodium ethlendiaminetetraacetic acid, calcium ethlendiaminetetraacetic acid, diethylenetriaminepentaacetic acid and bis(2-aminoethyl) ether tetraacetic acid.

The second ingredient of our invention employs sodium tripolyphosphate which is a sequestering agent and although it falls within the same classification as chelates in the types of base ion exchange substances, this agent works somewhat different than chelates, however, in that it greatly increases the carrying capacity of water for silicates, oxalates, as well as other poorly soluble ion salts by sequesteration (forming complex ions, presumably by chelation) and as a colloid dispersing and stabilizing agent (peptization, defluocculation, emulsification, etc.) thus preventing accumulation of insoluble precipitates within the animal's body such as demonstrated in the formation of urinary calculi. Further, sequestrants combine with proteins thus increasing protein dispersion, increasing solubility and partial hydrolysis by preventing interference of metals by binding of proteins forming a metal bond protein. This is important because some phases of urinary calculi consist of a mucoprotein complex with layers of mineral elements (mostly cations) on the surface. The concentration of the mucopolysaccharide portion of the protein is in direct ratio to the level of protein in the ration. The sequestrants in our invention apparently have an effect on the urinary organic matrix mucoprotein complex formation. Other sequestrants which can be used are S.Q. phosphate, sodium hexametaphosphate, sodium acid pyrophosphate, tetrasodium pyrophosphate.

The next ion base exchange substance is a chelating resin. We have used poly-n-vinyl-5-methyl-2-oxazolidone. This ingredient can replace one-half of the amount of EDTA used in our formulation. Its main action seems to be the formation of bonds and a non-bond configuration where anions are involved. Copolymer-N-vinyl-5-methyl-2-oxozolidinone and vinyl acetate may also be used.

The agent that comes under the classification of colloidal carrier which we employ is carboxymethyl-cellulose. This is not a cation base exchange substance. Carboxymethylcellulose acts as an anion exchange substance as well as an absorber or a blocker of reactivity of cations with poorly soluble anions such as carbonates, sulfates, phosphates, etc. It could be defined as a hydrophilous colloid with an action of keeping urinary crystalloids in solution, thus preventing aggregation of particles. It helps to keep sulfates in suspension, adds to water carrying capacity and would demonstrate some synergistic action with sodium tripolyphosphate. Colloidal carriers which can be used are sodium carboxymethylcellulose, potassium carboxymethylcellulose and general classification of cellulose gums.

The dosage range which is effective yet does not disturb the animal's feed consumption is

| | |
|---|---|
| Cattle | 3 grams to 15 grams. |
| Sheep | 1 gram to 6 grams. |
| Poultry | 120 mgs. to 300 mgs. |
| Cats | 150 mgs. to 300 mgs. |
| Dogs | 450 mgs. to 4.5 grams. |
| Mink | 270 mgs. to 300 mgs. |

The effective ranges of the drugs used singularly for each type of animal is the following:

| | Chelates | Sequestrants |
|---|---|---|
| Cattle | 1 gram to 5 grams | 1 gram to 5 grams. |
| Sheep | ½ gram to 2 grams | ½ gram to 2 grams. |
| Poultry | 40 mgs. to 100 mgs | 40 mgs. to 100 mgs. |
| Cats | 50 mgs. to 100 mgs | 50 mgs. to 100 mgs. |
| Dogs | 150 mgs. to 1500 mgs | 150 mgs. to 1500 mgs. |
| Mink | 90 mgs. to 300 mgs | 90 mgs. to 300 mgs. |

| | Chelating resins | Colloidal carriers |
|---|---|---|
| Cattle | 1 gram to 5 grams | 1 gram to 5 grams. |
| Sheep | ½ gram to 2 grams | ½ gram to 2 grams. |
| Poultry | 40 mgs. to 100 mgs | 40 mgs. to 100 mgs. |
| Cats | 50 mgs. to 100 mgs | 50 mgs. to 100 mgs. |
| Dogs | 150 mgs. to 1500 mgs | 150 mgs. to 1500 mgs. |
| Mink | 90 mgs. to 300 mgs | 90 mgs. to 300 mgs. |

Equal or approximately equal parts of chelates, chelating resins, sequestrants, colloidal carriers are preferred, administered in the ranges above according to the particular animal, however, it is possible to use anywhere from 40 mgs. to 5000 mgs. of each of the desired components depending on the particular animal and whether it is being used prophylactically or therapeutically. These materials are blended together in ribbon mixers. In actual manufacture, one may add two to seven grams inert carrier with each dose active ingredients. This would cause the finished product to be of a bulkier consistency making its administration easier. The finished product is administered to the animal by blending it into the animal's daily ration or by sprinkling it over the animal's feed. Therefore, dosing in the form of capsules or tablets might be accomplished in the case of one animal involvement.

The composition is administered to the animal in the proportion of from 0.08% to 3.2% by weight of feed.

For treatment of active urinary calculi cases, the larger dosage for the species involved would be indicated. On prevention, the smaller dosage for the species involved is indicated. A good ration adequately fortified with vitamins is also indicated.

To illustrate the novel effects of the above composition, a commercial trial of Formula No. 1 was conducted in a Central California feed lot. Five hundred and three head of steers were put at 5 grams per head, per day, for a period of three days. Before the cattle were put on Formula No. 1, one death from urinary calculi had resulted, sixteen cases of urinary calculi had been diagnosed, and two "dribblers" had been marked. At the conclusion of the three day trial, no cattle were showing signs of urinary calculi; the two "dribblers" showed no symptoms of urinary calculi; no new cases had developed. The steers ate the medicated feed readily and there were no apparent side effects.

The Formula No. 1 was used as a top dressing to regular feed after being mixed with suncured alfalfa meal, dehydrated alfalfa meal, stabilized vitamin A (250,000 units/head/day) plus a feed enthuser.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:
1. A composition for the prevention and treatment of urinary calculi in animals consisting of ethylenediaminetetraacetic acid, sodium tripolyphosphate, poly-n-vinyl-5-methyl-2-oxazolidone and carboxymethylcellulose.

2. A composition for the prevention and treatment of urinary calculi in animals consisting of ethylenediaminetetraacetic acid, sodium tripolyphosphate and carboxymethylcellulose.

3. A synergistic composition for preventing and treating urinary calculi in animals comprising, a chelate selected from the group consisting of ethylenediaminetetraacetic acid, sodium ethylenediaminetetraacetic acid, calcium ethylenediaminetetraacetic acid, diethylenetriaminepentaacetic acid, and bis(2-aminoethyl) ether tetraacetic acid and a sequestering agent selected from the group consisting of sodium tripolyphosphate, S.Q. phosphate, sodium hexametaphosphate, sodium acid pyrophosphate, and tetrasodium pyrophosphate and a colloidal carrier selected from the group consisting of sodium carboxymethylcellulose, potassium carboxymethylcellulose, and cellulose gums.

4. A synergistic composition for preventing and treating urinary calculi in animals comprising, a chelate selected from the group consisting of ethylenediaminetetraacetic acid, sodium ethylenediaminetetraacetic acid, calcium ethylenediaminetetraacetic acid, diethylenetriaminepentaacetic acid, and bis(2-aminoethyl) ether tetraacetic acid and a sequestering agent selected from the group consisting of sodium tripolyphosphate, S.Q. phosphate, sodium hexametaphosphate, sodium acid pyrophosphate, and tetrasodium pyrophosphate and a colloidal carrier selected from the group consisting of sodium carboxymethylcellulose, potassium carboxymethylcellulose, and cellulose gums, and a chelating resin selected from the group consisting of N-vinyl-5-methyl-2-oxazolidinone, and copolymer-N-vinyl-5-methyl-2-oxazolidinone, and vinyl acetate.

5. A process for preventing and treating urinary calculi in animals which comprises administering a composition comprising a chelate selected from the group consisting of ethylenediaminetetraacetic acid, sodium ethylenediaminetetraacetic acid, calcium ethylenediaminetetraacetic acid, diethylenetriaminepentaacetic acid, and bis-(2-aminoethyl) ether tetraacetic acid and a sequestering agent selected from the group consisting of sodium tripolyphosphate, S.Q. phosphate, sodium hexametaphosphate, sodium acid pyrophosphate, and tetrasodium pyrophosphate and a colloidal carrier selected from the group consisting of sodium carboxymethylcellulose, potassium carboxymethylcellulose, and cellulose gums in solid form to the animal in its feed.

6. A process for preventing and treating urinary calculi in animals which comprises administering a composition comprising a chelate selected from the group consisting of ethylenediaminetetraacetic acid, sodium ethylenediaminetetraacetic acid, calcium ethylenediaminetetraacetic acid, diethylenetriaminepentaacetic acid, and bis-(2-aminoethyl) ether tetraacetic acid and a sequestering agent selected from the group consisting of sodium tripolyphosphate, S.Q. phosphate, sodium hexametaphosphate, sodium acid pyrophosphate, and tetrasodium pyrophosphate and a colloidal carrier selected from the group consisting of sodium carboxymethylcellulose, potassium carboxymethylcellulose, and cellulose gums, and a chelating resin selected from the group consisting of N-vinyl-5-methyl-2-oxazolidinone, and copolymer-N-vinyl-5-methyl-2-oxazolidinone, and vinyl acetate in solid form to the animal in its feed.

7. A process for preventing and treating urinary calculi in animals which comprises feeding from 0.08% to 3.2% by weight of the feed, of a composition comprising a chelate selected from the group consisting of ethylenediaminetetraacetic acid, sodium ethylenediaminetetraacetic acid, calcium ethylenediaminetetraacetic acid, diethylenetriaminepentaacetic acid, and bis(2-aminoethyl) ether tetraacetic acid and a sequestering agent selected from the group consisting of sodium tripolyphosphate, S.Q. phosphate, sodium hexametaphosphate, sodium acid pyrophosphate, and tetrasodium pyrophosphate and a colloidal carrier selected from the group consisting of sodium carboxymethylcellulose, potassium carboxymethylcellulose, and cellulose gums to the animal.

8. A process for preventing and treating urinary calculi in animals which comprises feeding from 0.08% to 3.2% by weight of the feed, of a composition comprising a chelate selected from the group consisting of ethylenediaminetetraacetic acid, sodium ethylenediaminetetraacetic acid, calcium ethylenediaminetetraacetic acid, diethylenetriaminepentaacetic acid, and bis(2-aminoethyl) ether tetraacetic acid and a sequestering agent selected from the group consisting of sodium tripolyphosphate, S.Q. phosphate, sodium hexametaphosphate, sodium acid pyrophosphate, and tetrasodium pyrophosphate and a colloidal carrier selected from the group consisting of sodium carboxymethylcellulose, potassium carboxymethylcellulose, and cellulose gums, and a chelating resin selected from the group consisting of N-vinyl-5-methyl-2-oxazolidinone, and copolymer-N-vinyl-5-methyl-2-oxazolidinone, and vinyl acetate to the animal.

References Cited in the file of this patent

UNITED STATES PATENTS 2,872,322   Walles _____ Feb. 3, 1959

OTHER REFERENCES

Eisner: The J. of Pharmacology and Experimental Therapeutics, August 1953, pages 442 to 449 (167–65, chelate).

Abehouse: Chem. Abst., vol. 47, 1953, pages 8240i and 8241a.

U.S. Dispensatory, 25th edition (1955); Lippincott Co., Phila., Pa., pp. 1264, 1265.

Merck Index, sixth edition, 1952; Merck & Co., Rahway, N.J., pp. 880 and 886.